United States Patent [19]

Perrin

[11] Patent Number: 4,978,704
[45] Date of Patent: Dec. 18, 1990

[54] STORAGE-STABLE ORGANOPOLYSILOXANE COMPOSITIONS MOISTURE-CURABLE INTO ELASTOMERIC STATE

[75] Inventor: Patrice Perrin, Lyons, France

[73] Assignee: Rhone-Poulenc Chimie, Courbevoie, France

[21] Appl. No.: 334,692

[22] Filed: Apr. 7, 1989

[30] Foreign Application Priority Data

Apr. 7, 1988 [FR] France .................................. 88 04850

[51] Int. Cl.$^5$ ................................................. C08K 3/38
[52] U.S. Cl. .................................... 524/404; 524/264; 524/267; 524/268; 524/731; 524/848; 524/860; 524/127; 524/710; 524/314; 524/773; 524/425; 524/448; 524/431; 524/445; 524/430; 524/433; 524/405; 524/418; 524/783; 524/788; 524/779; 524/789; 524/785; 524/786; 528/34; 528/17; 528/18; 528/33; 528/901; 525/106; 525/476; 525/477
[58] Field of Search ...................... 528/34, 901, 17, 18, 528/33; 525/106, 477, 476, ; 524/265, 267, 268, 731, 848, 860, 127, 710, 314, 773, 448, 425, 431, 445, 430, 433, 404, 405, 418, 783, 788, 779, 789, 785, 786

[56] References Cited

U.S. PATENT DOCUMENTS

| 3,077,465 | 2/1963 | Bruner | 528/34 |
| 4,602,078 | 7/1986 | Joseph et al. | 528/19 |
| 4,727,168 | 2/1988 | Yoshino et al. | 556/40 R |
| 4,797,446 | 1/1989 | Dietlein et al. | 528/19 |

FOREIGN PATENT DOCUMENTS

| 0050453 | 4/1982 | European Pat. Off. . |
| 0178751 | 4/1986 | European Pat. Off. . |
| 0186839 | 7/1986 | European Pat. Off. . |
| 0221644 | 5/1987 | European Pat. Off. . |
| 2067212 | 7/1981 | United Kingdom . |

Primary Examiner—Melvyn I. Marquis
Attorney, Agent, or Firm—Burns, Doane, Swecker & Mathis

[57] ABSTRACT

Organopolysiloxane compositions that are storage-stable under anhydrous conditions, but curable into elastomeric state in the presence of moisture and, thus, are well suited as sealants and coatings and which particularly strongly adhere to substrate used in the construction industry, contain at least one α, ω-dihydroxydiorganopolysiloxane polymer; at least one acyloxysilane crosslinking agent therefor; a bonding agent including admixture, or reaction product of, (i) an aminoorganosilicon compound containing a primary amine group, with (ii) an organosilicon compound containing an epoxy functional group; and, advantageously, a filler material and a curing catalyst.

14 Claims, No Drawings

STORAGE-STABLE ORGANOPOLYSILOXANE COMPOSITIONS MOISTURE-CURABLE INTO ELASTOMERIC STATE

CROSS-REFERENCE TO COMPANION APPLICATION

Copending application, Ser. No. 334,691, filed concurrently herewith and assigned to the assignee hereof.

BACKGROUND OF THE INVENTION

1. Field of the Invention

The present invention relates to novel organopolysiloxane compositions that are storage-stable in the absence of moisture, but curable into self-adhesive elastomeric state in the presence thereof, and, more especially, to novel storage-stable organopolysiloxane compositions containing an $\alpha,\omega$-dihydroxydiorganopolysiloxane, an acyloxysilane crosslinking agent and a bonding agent which comprises (i) admixture of an aminoorganosilicon compound bearing a primary amine substituent and an organosilicon compound bearing an epoxy functional group, or (ii) reaction product between such aminoorganosilicon/epoxyorganosilicon compounds.

2. Description of the Prior Art

One-component organopolysiloxane compositions containing an acyloxysilane crosslinking agent, and, generally, also an inorganic filler and a curing catalyst, have long been known to this art. Such compositions are described, in particular, in U.S. Pat. Nos. 3,077,465, 3,382,205, 3,701,753, 3,957,714, 4,115,356, and 4,273,698, and in FR-A-No. 2,429,811 and FR-A-No. 2,459,820.

These compositions are particularly useful in coating and jointing applications and, notably, as sealing agents in the construction industry for producing glazed structures.

For this particular application, the hardened elastomer must have a relatively low modulus of elasticity and, above all, adhere strongly to glass and to the material forming the structure in which the glass is mounted, such as wood, aluminum, concrete, PVC (polyvinyl chloride), natural and synthetic rubbers, stone, earthenware and brick.

However, the elastomers produced from compositions containing acyloxysilane crosslinking agents generally exhibit insufficient bonding to certain substrate materials employed in the construction industry, aluminum and PVC in particular. Various additives have been proposed to this art for incorporation into such compositions with a view to remedying this deficiency.

Thus, U.S. Pat. No. 4,115,356 describes a trialkoxysilane bearing an epoxy functional group useful as a bonding agent for silicone elastomer compositions comprising a polyacyloxysilane crosslinking agent.

A typical such silane is:

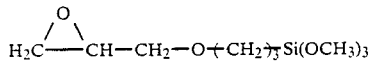

$\gamma$-glycidoxypropyltrimethoxysilane.

It is also known to the art that a bonding agent comprising the reaction product or a simple mixture of an aminopolyalkoxysilane and an epoxypolyalkoxysilane may be used in two-component (EP-A-No. 178,751) and one-component (EP-A-No. 221,644) silicone elastomer compositions containing polyalkoxysilane crosslinking agents.

It too is known that aminosilanes bearing a primary amine substituent may be used in one-component (see, for example, EP-A-No. 021,859) or two-component (see, for example, U.S. Pat. No. 3,888,815) alkoxyorganopolysiloxane compositions, and in organopolysiloxane compositions containing ketiminoxysilane crosslinking agents (see, for example, FR-A-No. 2,074,144).

Nonetheless, one skilled in this art would discount the use of such type of silane in one-component organopolysiloxane compositions comprising acyloxy groups, as these acid formulations always contain small amounts of free carboxylic acid which, by reacting with the primary amine, produce water that causes the composition to crosslink. Hence, these compositions are not stable under storage conditions.

SUMMARY OF THE INVENTION

It has now surprisingly and unexpectedly been found that by incorporating a mixture of, or the product of a reaction between, an aminoorganosilicon compound bearing a primary amine functional group and an organosilicon compound bearing an epoxy functional group, an organopolysiloxane composition is produced that is stable in storage, in the absence of atmospheric moisture, but which crosslinks in the presence thereof to provide an elastomer having good mechanical properties. Furthermore, such elastomer bonds perfectly to any support, particularly those used in the construction industry, notably aluminum and PVC.

Also, the bonding agent according to the invention does not require any prolonged crosslinking times.

Briefly, the present invention features novel organopolysiloxane compositions that are storage-stable in the absence of moisture, but hardenable into elastomeric state in the presence of moisture, which comprise:

(A) 100 parts by weight of at least one $\alpha,\omega$-dihydroxydiorganopolysiloxane polymer having a viscosity of 700 to 1,000,000 mPa.s at 25° C., comprising recurring diorganosiloxy structural units of the formula $T_2SiO$, in which the T radicals, which may be identical or different, represent hydrocarbon radicals having from 1 to 10 carbon atoms, at least 50% of the number of such T radicals being methyl radicals;

(B) 0.5 to 20 parts by weight of at least one crosslinking agent comprising at least one acyloxysilane;

(C) 0.1 to 10 parts by weight of a bonding agent comprising admixture, or interreaction product of:
(i) an aminoorganosilicon compound $C_1$ bearing at least one amino functional group and comprising a primary amine substituent; and
(ii) an organosilicon compound $C_2$ bearing at least one epoxy functional group and having from 4 to 20 carbon atoms, in a ratio of 0.01 to 2 equivalents of primary amine group of $C_1$ per one equivalent of epoxy functional group in $C_2$;

(D) 5 to 250 parts by weight of inorganic filler material; and (E) 0.0004 to 3 parts by weight of a metal catalyst compound for catalyzing the hardening reaction.

DETAILED DESCRIPTION OF THE PREFERRED EMBODIMENTS OF THE INVENTION

More particularly according to the present invention, the aminoorganosilicon compound $C_1$ bearing at least one amino functional group advantageously has one of the following formulae $C_1A$, $C_1B$ or $C_1IC$: $C_1A$: silanes of the formula:

RHNR'Si(OR")$_{3-a}$ in which R is a hydrogen atom, an alkyl radical having from 1 to 6 carbon atoms, inclusive, or an aliphatic hydrocarbon radical linked to the nitrogen atom by a carbon bond and containing at least one primary amine group; R' is a divalent hydrocarbon radical having from 1 to 6 carbon atoms, optionally containing an ether bridge; R" is an alkyl or alkoxyalkyl radical having less than 8 carbon atoms; X is a vinyl radical, phenyl radical, or alkyl radical having from 1 to 6 carbon atoms; and a is 0 or 1.

Exemplary of such silanes $C_1A$, representative are those having the following formulae:
$(CH_3O)_3Si(CH_2)_3NH(CH_2)_2NH_2$; $(CH_3OCH_2CH_2O)_3Si(CH_2)_2NH_2$; $(C_2H_5O)_3Si(CH_2)_3NH_2$; $(CH_3OCH_2CH_2O)_3Si(CH_2)_3NH_2$; $(C_2H_5O)_3Si(CH_2)_3O(CH_2)_3NH_2$; $(C_2H_5O)_2C_6H_5Si(CH_2)_3O(CH_2)_3NH_2$; $(C_2H_5O)_3SiCH_2O(CH_2)_2NH_2$; $(C_2H_5O)_3Si(CH_2)_3O(CH_2)_2NH_2$; $(C_2H_5O)_2CH_3Si(CH_2)_3NH_2$.

$C_1B$: aminoorganopolysiloxanes produced by reacting the silanes $C_1A$ with hydroxylated organopolysiloxanes (1) in proportions of 0.4 to 1.2 gram-equivalents of $NH_2$ group per gram-equivalent of hydroxyl group.

Representative such hydroxylated polymers particularly include:

(a) oils of the formula $HO[Si(CH_3)_2O]_yH$, in which the symbol y represents any number ranging from 2 to 22;

(b) resins in which the $CH_3/Si$ ratio is 1.6 or higher, containing at least 2% by weight of hydroxyl groups, principally comprised of recurring units of the formulae $(CH_3)_3SiO_{0.5}$, $(CH_3)_2SiO$ and $CH_3SiO_{0.5}$;

(c) methylpolysiloxane resins MQ comprising $(CH_3)_3SiO_{0.5}$ recurring units (M) and $SiO_2$ recurring units (Q), with an M/Q molar ratio ranging from 0.4 to 1.2 and having an OH weight content of 2 to 6%.

The reactants (1) and $C_1A$ are heated, preferably in a solvent medium, at a high enough temperature and for a sufficient period of time to eliminate the expected amount of alkanol formed during the reaction:

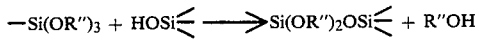

It is preferred to introduce the hydroxylated oil into an excess of aminosilane.

This results in the formation of copolymers which, other than the methyl groups, at one and the same time also comprise alkoxy groups such as methoxyl, ethoxyl or methoxyethyl and aminoorganic groups. Such copolymers are mentioned, for example, in FR-A-No. 1,381,590 and FR-A-No. 1,385,693.

$C_1C$: diorganopolysiloxanes comprising $(CH_3)(R'NHR)SiO$ recurring units, with R' and R being as defined above.

These polymers are described, for example, in GB-A-No. 1,306,680 and U.S. Pat. No. 4,412,035.

The organosilicon compound $C_2$ bearing an epoxy functional group and having from 4 to 20 carbon atoms is advantageously selected from among those of the formulae $C_2A$, $C_2B$ or $C_2C$:

$C_2A$: silanes of the formula:

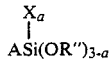

ASi(OR")$_{3-a}$ in which X, R" and a are as defined above for $C_1A$; and A is an organic hydrocarbon radical bearing an epoxy group and having from 4 to 20 carbon atoms.

Specific examples of such silanes are the following:

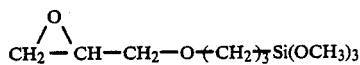

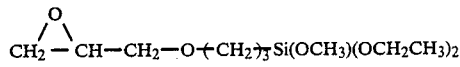

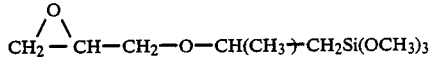

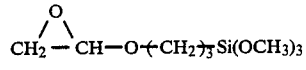

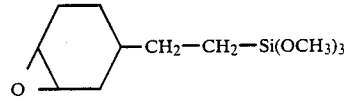

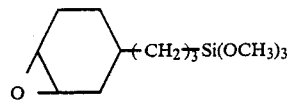

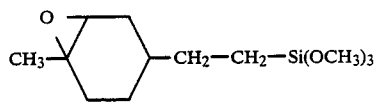

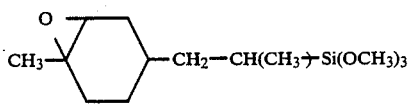

$C_2B$: diorganopolysiloxanes endblocked with an epoxy functional group resulting from the reaction of the silanes $C_2A$ with the same linear or branched hydroxylated organopolysiloxanes (1) used to synthesize the above polymers $C_1B$.

The polymers $C_2B$ are described, for example, in U.S. Pat. Nos. 4,033,924, 4,082,726, 4,412,035 and EP-A-No. 164,879.

More especially preferred are the products of the reaction between the hydroxylated resins MQ defined above for producing $C_1B$ and the silanes $C_2A$ as described, for example, in EP-A-No. 226,934.

$C_2C$: diorganopolysiloxanes comprising $ACH_3SiO$ recurring units, with A being as defined above.

These polymers are described, in particular, in U.S. Pat. Nos. 3,455,877, 4,252,933 and FR-A-No. 2,012,012.

In order to improve the storage stability of the subject compositions, it is recommended to have a deficiency of $C_1$ relative to $C_2$, calculated in gram-equivalents of a $C_1$ primary amine group relative to the content in gramequivalents of a $C_2$ epoxy group. The exact stoichiometric equivalent is preferred.

Thus, it is preferred to use amounts of $C_1$ and $C_2$ according to a ratio of 0.01 to 1, preferably 0.1 to 1, inclusive.

When they are mixed, the compounds $C_1$ and $C_2$, in particular the silanes $C_1A$ and $C_2B$, may react with each other to form addition products.

The reaction may thus be accelerated by having mixed beforehand the two silanes at a temperature of from 20° to 80° C.

The preferred addition products have the formulae:

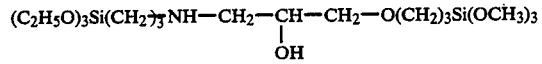

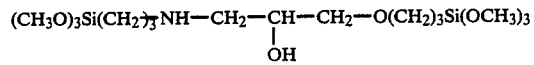

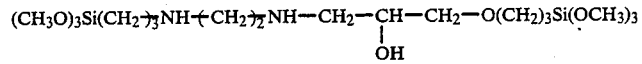

The $\alpha,\omega$-di(hydroxy)diorganopolysiloxane polymers (A) having viscosities of 700 to 1,000,000 mPa.s at 25° C., preferably 1,000 to 700,000 mPa.s at 25° C., are linear polymers consisting essentially of diorganosiloxy units of the abovementioned formula $T_2SiO$, having a terminal hydroxyl group at each end of their polymer chains; however, the presence of mono-organosiloxy units of the formula $TSiO_{1.5}$ and/or siloxy units of formula $SiO_2$, in a proportion of up to 2% relative to the number of diorganosiloxy units, is also within the scope of the invention.

The hydrocarbon radicals, having from 1 to 10 carbon atoms, optionally bearing halogen atom or cyano group substituents, represented by the symbols T, include:

Alkyl and haloalkyl radicals having from 1 to 10 carbon atoms, such as methyl, ethyl, propyl, isopropyl, butyl, pentyl, hexyl, 2-ethylhexyl, octyl, decyl, 3,3,3-trifluoropropyl, 4,4,4-trifluorobutyl and 4,4,4,3,3-pentafluorobutyl radicals;

Cycloalkyl and halogenated cycloalkyl radicals having from I to 10 carbon atoms, such as cyclopentyl, cyclohexyl, methylcyclohexyl, propylcyclohexyl, 2,3-difluorocyclobutyl, and 3,4-difluoro-5-methylcycloheptyl radicals;

Alkenyl radicals having from 2 to 4 carbon atoms, such as vinyl, allyl and 2-butenyl radicals;

Mononuclear aryl and halogenated aryl radicals having from 6 to 10 carbon atoms, such as phenyl, tolyl, xylyl, chlorophenyl, dichlorophenyl and trichlorophenyl radicals;

Cyanoalkyl radicals, the alkyl moieties of which having from 2 to 3 carbon atoms, such as $\beta$-cyanoethyl and $\gamma$-cyanopropyl radicals;

Methyl, phenyl, vinyl and 3,3,3-trifluoropropyl radicals are the preferred radicals. 10 Exemplary of the units having the formula $T_2SiO$, those having the following formulae are representative $(CH_3)_2SiO$;
$CH_3(CH_2=CH)SiO$;
$CH_3(C_6H_5)SiO$;
$(C_6H_5)_2SiO$;
$CF_3CH_2CH_2(CH_3)SiO$;
$NC-CH_2CH_2(CH_3)SiO$;
$NC-CH(CH_3)CH_2(CH_2=CH)SiO$;
$NC-CH_2CH_2CH_2(C_6H_5)SiO$.

It will be appreciated that the polymer (A) may be a mixture of $\alpha,\omega$-di(hydroxy)diorganopolysiloxane polymers that differ from one another in molecular weight and/or in the nature of the groups linked to the silicon atoms.

These $\alpha,\omega$-di(hydroxy)diorganopolysiloxane polymers (A) are commercially available; moreover, they may easily be produced by methods that are now well known to this art.

The crosslinking agents (B) are incorporated in proportions of 0.5 to 25 parts by weight, preferably 1 to 18 parts, per 100 parts by weight of (A). These are compounds containing more than two acyloxy radicals per molecule.

The crosslinking agent (B) preferably has the general formula:

$$R_a^1Si(OCOR^2)_{4-a}$$

in which $R^1$ has the same definition as T, given above under (A); $R^2$ is a hydrocarbon radical devoid of aliphatic unsaturation, having from 1 to 15 carbon atoms, and comprising linear or branched chain alkyl, cycloalkyl and aryl radicals.

Specific examples of crosslinking agents (B) are those having the following formulae:
$CH_3Si(OCOCH_3)_3$
$C_2H_5Si(OCOCH_3)_3$
$CH_2=CHSi(OCOCH_3)_3$
$C_6H_5Si(OCOCH_3)_3$
$CH_3Si[(OCOCH(C_2H_5)(CH_2)_3\ CH_3]_3$
$CF_3CH_2CH_2Si(OCOC_6H_5)_3$
$CH_3Si(OCOC_6H_5)_3$
$CH_3Si(OCOCH_3)_2OCOCH(C_2H_5)(CH_2)_3CH_3$
$CH_3COOSi[OCOCH(C_2H_5)(CH_2)_3CH_3]_3$ These crosslinking agents (B) may be used in combination with silanes (B$_1$) containing only two acyloxy groups, such as, for example:
$(CH_3)_2Si(OCOCH_3)_2$
$[(CH_3)_3CO]_2Si(OCOCH_3)_2$
$CH_2=CH(CH_3)Si(OCOCH_3)_2$
$(C_6H_5)_2Si(OCOCH_3)_2$
$(CH_3)_2Si[OCOCH(C_2H_5)(CH_2)_3CH_3]_2$
$(CH_3)_3CO_2SiOCOCH(C_2H_5)(CH_2)_3CH_3]_2$ $[(CH_3)_3CO]_2Si(OCOCH_3)_2$, namely, di-t-butoxydiacetoxysilane, is more particularly preferred because, in combination with the bonding agent (C) according to the invention, in a weight ratio $B_1/C$ of from 0.1 to 2, inclusive; $B_1$ very greatly improves the bonding to untreated or anodized aluminum and rigid PVC.

The inorganic fillers (D) are incorporated in proportions of 5 to 250 parts by weight, preferably 20 to 200 parts, per 100 parts by weight of $\alpha,\omega$-di(hydroxy)diorganopolysiloxane polymers (A).

These fillers may be in the form of very finely divided particulates whose mean particle diameter is less than 0.I micrometer. Exemplary such fillers are the types of silica produced by combustion and those produced by precipitation; their BET specific surface area is generally greater than 40 m$^2$/g.

These fillers may also be in the form of more coarsely divided particles, of mean particle diameter greater than 0.1 micrometer. Examples of such fillers include ground quartz, diatomaceous types of silica, treated or untreated calcium carbonate, calcined clay, rutile type titanium dioxide, the oxides of iron, zinc, chromium, zirconium or magnesium, the different forms of alumina (hydrated or unhydrated), boron nitride, lithopone, barium metaborate, barium sulfate, glass microbeads; their specific surface area is generally less than 30 m$^2$/g.

The fillers (D) may have had their surface area modified by treatment with the various organosilicon compounds customarily used for this purpose. Thus, such organosilicon compounds include the organochlorosilanes, diorganocyclopolysiloxanes, hexorganodisiloxanes, hexorganodisilazanes or diorganocyclopolysiloxanes (FR-A-Nos. 1,126,884, FR-A-No. 1,136,885, FR-A-No. 1,236,505; British Patent GB-A-No. 1,024,234). In most cases, the treated fillers contain 3 to 30% of organosilicon compounds relative to their weight.

The fillers (D) may be a mixture of several types of fillers of different particle sizes; thus, for example, they may comprise 5 to 95% of finely divided silicas of BET specific surface area greater than 40 m$^2$/g and 95 to 5% of more coarsely divided silicas of specific surface area less than 30 m$^2$/g or of treated or untreated calcium carbonate.

The compositions contain a catalyst (E) which is a compound of a metal generally selected from among tin, iron, titanium and zirconium.

0.0004 part to 3 parts by weight of (E) are generally incorporated per 100 parts by weight of (A).

Insofar as tin is concerned, the most typical such catalysts are dialkyltin dicarboxylates and, in particular, dibutyltin dilaurate or diacetate (text by Noll, *Chemistry and Technology of Silicones*, page 337, 1968 Edition), and the dibutyltin diversatates of FR-A-No. 2,066,159.

The products of a reaction between dialkyl tin dicarboxylates and polyalkoxysilanes or alkyl polysilicates (U.S. Pat. Nos. 3,186,963 and 3,862,919 and BE-A-No. 842,305) may also be used.

Tin chelates (as described in EP-A-No. 147,323 and EP-A-No. 235,049) may also be used.

Where titanium and zirconium are concerned, the catalysts described in EP-A-No. 102,268 may be used.

The above patents describing the catalysts that may be used for the hardening reaction are hereby expressly incorporated by reference.

Other than the components (A) to (E) described above, the compositions according to the invention may contain other ingredients, adjuvants and additives.

Among such ingredients are organosilicon compounds, principally polymers which have the ability to favorably influence the physical properties of the compositions according to the invention and/or on the mechanical properties of the silicone elastomers produced from these compositions, employed in proportions of 1 to 150 parts by weight per 100 parts by weight of (A).

These compounds are well known to the art; they include, for example:

$\alpha,\omega$-Bis(triorganosiloxy)diorganopolysiloxane polymers having viscosities of at least 10 mPa.s at 25° C. in which the organic radicals linked to the silicon atoms are selected among methyl, vinyl and phenyl radicals; it is preferred to use the $\alpha,\omega$-bis(trimethylsiloxy)dimethylpolysiloxane polymers having viscosities of 10 mPa.s at 25° C. to 1,500 mPa.s at 25° C;

Liquid branched methylpolysiloxane polymers, containing 0.1 to 8% of hydroxyl groups linked to the silicon atoms, comprising $(CH_3)_3SiO_{0.5}$, $(CH_3)_2SiO$, $CH_3SiO_{1.5}$ recurring units distributed such as to provide a $(CH_3)_3SiO_{0.5}/(CH_3)_2SiO$ ratio of 0.01 to 0.15 and a $CH_3SiO_{1.5}/(CH_3)_3SiO$ ratio of 0.1 to 1.5;

$\alpha,\omega$-Di(hydroxy)dimethylpolysiloxane oils having viscosities of 10 to 300 mPa.s at 25° C. and the $\alpha,\omega$-di(hydroxy)methylphenylpolysiloxane oils having viscosities of 200 to 1,000 mPa.s at 25° C.; and Diphenylsilanediol, 1,1,3,3-tetramethyldisiloxanediol.

The above $\alpha,\omega$-bis(triorganosiloxy)diorganopolysiloxane polymers may be wholly or partially replaced by organic compounds that are inert towards the various components of the bases and miscible at least with the diorganopolysiloxane polymers (A).

Examples of organic plasticizers, in particular, include petroleum cuts of boiling point above 200° C., comprising mixtures of aliphatic and/or aromatic hydrocarbons, polybutylenes, preferably of low molecular weight, as described in FR-A-No. 2,254,231, FR-A-No. 2,293,831 and FR-A-No. 2,405,985, alkylation products of benzene, in particular, the polyalkylbenzenes obtained by alkylation of benzene with long chain linear or branched chain olefins, in particular olefins having 12 carbon atoms produced by the polymerization of propylene, as described, for example, in FR-A-No. 2,446,849.

Organic polydiorganosiloxane mixed polymers may also be used, such as polyoxyalkylene polyorganosiloxane block copolymers, phosphoric esters (FR-A-No. 2,372,203), trioctyl phosphate (FR-A-No. 2,415,132), dialcohol esters of dicarboxylic acids (U.S. Pat. No. 2,938,007) and cycloalkylbenzenes (FR-A-No. 2,392,476).

The alkylation products of benzene having molecular weights above 200, in particular the alkylbenzenes and the polyalkylbenzenes, are the preferred organic plasticizers.

Non-organosilicon ingredients may also be introduced, for example heat stabilizers. These compounds improve the heat resistance of the silicone elastomers. They may be selected from among the rare earth salts of carboxylic acids, their oxides and hydroxides, and more especially ceric oxides and hydroxides, as well as the titanium dioxide produced by combustion and the various iron oxides. It is advantageous to use 0.1 to 15 parts by weight, preferably 0.15 to 12 parts, of heat stabilizers per 100 parts by weight of diorganopolysiloxanes (A).

In order to formulate the compositions according to the invention, it is recommended to use apparatus which enables the components (A), (B), (C), (D) and (E), and optionally the abovementioned ingredients, adjuvants and additives, to be intimately admixed in the absence of moisture, either with or without heating.

All of these ingredients may be charged to the apparatus in any order. Thus, the α,ω-dihydroxydimethylpolysiloxane oils (A) and fillers (D) may be mixed first, with the component (C) subsequently being added to the resulting mix, and then the crosslinking agents (B) and catalyst (E) are added.

It is also possible to mix oils (A) and crosslinking agents (B) and subsequently to add fillers (D), bonding agent (C) and catalyst (E) to the homogeneous products of the reaction of these two components (A) and (B). Over the course of these operations, the mixtures may be heated to a temperature in the range of 50° to 180° C. under atmospheric pressure, or under reduced pressure such as to promote the removal of volatile materials such as water, polymers of low molecular weight, organic acids and oximes.

The compositions prepared in this manner may be used as is, or in the form of dispersions in organic diluents. These diluents are preferably products commonly available and selected from among:

Halogenated or unhalogenated aliphatic, cycloaliphatic or aromatic hydrocarbons, such as n-heptane, n-octane, cyclohexane, methylcyclohexane, toluene, xylene, mesitylene, cumene, tetralin, perchloroethylene, trichloroethane, tetrachloroethane, chlorobenzene and orthodichlorobenzene;

Aliphatic and cycloaliphatic ketones, such as methyl ketone, methyl isobutyl ketone, cyclohexanone and isophorone; and Esters, such as ethyl acetate, butyl acetate and ethylglycol acetate.

The amounts of diluent introduced must be sufficient to provide stable dispersions which can be easily spread on substrates. These amounts depend essentially on the nature and the viscosities of the original organopolysiloxane compositions. Hence, they may vary over wide ranges; nevertheless, it is recommended that dispersions be produced containing 15% to 85% of diluents, by weight.

The compositions according to the invention, whether used as is or in the form of dispersions, are stable in storage in the absence of water, and harden beginning at ambient temperature (after elimination of the solvents in the case of dispersions) in the presence of water to form elastomers.

After depositing the compositions, as is, on solid substrates, in a moist atmosphere, their hardening into elastomeric state is observed to take place from the outside of the deposited mass inwards. A skin is first formed on the surface, then crosslinking proceeds to the core of the material. Complete skin formation, which results in the surface having a non-sticky feel, requires a period of time that may range from 1 minute to 55 minutes; this period of time depends on the relative humidity of the atmosphere surrounding the compositions and on their crosslinking ability.

Moreover, in-depth hardening of the deposited layers, which must be sufficient to enable the resulting elastomers to be demolded and handled, requires a longer period of time. Indeed, this time period depends not only on the factors mentioned above in connection with obtaining a non-sticky feel, but also on the thickness of the deposited layer, which thickness generally ranges from 0.5 mm to several centimeters. This longer period of time may range from 10 minutes to 15 hours.

The compositions adhere perfectly to any substrate once hardened to elastomeric state, in particular to aluminum and PVC, without prior deposition of a bonding primer, even if the elastomer-coated substrates are to be subjected to considerable thermal, mechanical or other stresses/shocks.

The compositions may be used for many applications, such as jointing in the construction industry, assembling the most diverse types of material (metals, plastics, natural and synthetic rubbers, wood, cardboard, earthenware, brick, ceramics, glass, stone, concrete, masonry elements), insulation of electrical conductors, coating electronic circuits, preparation of molds for the production of shaped articles made of resin or synthetic foam.

The abovementioned dispersions of these compositions in diluents are more especially useful for thin layer impregnation of woven or nonwoven articles, coating metal, plastic or cellulosic sheet; they may, however, be sprayed, for example by spraying with a paint gun, on any substrate whatever, on which a coating on the order of 5 to 300 μm in thickness is required. After spraying the dispersions, the diluents evaporate and the released compositions harden to perfectly uniform rubbery films.

The hardening time typically ranges from 5 minutes to several hours, not exceeding 10 hours. This time period depends on the factors mentioned above in connection with the duration of hardening of compositions deposited in thicker layers and also on the speed with which the diluents evaporate. This method of depositing by spraying is very practical for thin film coating of very large surfaces and more especially the hulls of ships and the nets used in marine fish breeding. A non-stick silicone film coating on the surfaces of boats in contact with sea water avoids fouling of these surfaces due to the fixation and development of marine organisms such as algae, barnacles, oysters or ascidia; this application is mentioned, for example, in U.S. Pat. No. 3,702,778.

Moreover, this film of elastomer may be used as an inert, non-stick nontoxic coating on various substrates in contact with foodstuffs, such as (1) paper wrappers for confectionery or frozen meat, (2) metal tanks used for preparing ice cream and sorbets and (3) the metal nets in which bread dough is deposited and molded and which are placed in the ovens with their contents when the bread is baked. It may also be used as a non-stick, nontoxic coating for materials in contact With the human body, such as compresses or special dressings for burns.

In order to further illustrate the present invention and the advantages thereof, the following specific examples are given, it being understood that same are intended only as illustrative and in nowise limitative.

In said examples to follow, all parts and percentages are given by weight, unless otherwise indicated.

EXAMPLES 1 to 8 and COMPARATIVE EXAMPLES 9 and 10

(a) The various starting materials used in these examples were:
(1) an oil A having silanol end groups selected from among:
  (i) an oil $A_1$ which was a polydimethylsiloxane oil having silanol end groups, and having a viscosity of 70,000 mPa.s at 25° C.;
  (ii) an oil $A_2$ which was the same as A1 but had a viscosity of 135,000 mpa.s at 25° C.;
(2) a plasticizer P selected from among:

(i) an oil $P_1$ which was a polydimethylsiloxane oil having trimethylsiloxy end groups, and having a viscosity of 1,000 mPa.s at 25° C.;

(ii) an oil $P_2$ which was a polyalkylbenzene having a viscosity of 100 mPa.s at 25° C., marketed by MONSANTO Company under the trademark SANTOGEN ®;

(3) an acyloxy silane B selected from among:
  (i) $B_1$: a mixture (50/50 by weight) of ethyltriacetoxysilane and methyltriacetoxysilane;
  (ii) $B_2$: a mixture (20/80 by weight) of ethyltriacetoxysilane and methyltriacetoxysilane;
  (iii) $B_3$: ethyltriacetoxysilane;

(4) a bonding agent C selected from among:
  (i) $C_1$: the addition product of the formula:

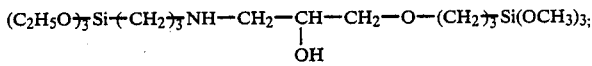

(ii) $C_2$: a mixture (50/50 by weight) of the addition product $C_1$ and di-t-butoxydiacetoxysilane;

(5) a filler D selected from among:
  (i) $D_1$: an untreated pyrogenic silica of BET specific surface area 150 $M^2$ g;
  (ii) $D_2$: a pyrogenic silica of BET specific surface area 60 $m^2/g$ and treated with octamethyltetracyclopolysiloxane;
  (iii) $D_3$: a calcium carbonate of mean particle size 5 $\mu m$;

(6) a catalyst E selected from among:
  (i) $E_1$: dibutyltin dilaurate;
  (ii) $E_2$: butyl titanate.

The various starting materials and their amounts in parts by weight of the compositions of the examples are reported in Table I below.

(b) Operating conditions for preparing the compositions:

100 parts of oil A, the plasticizer P and filler D were introduced into a mill under anhydrous conditions.

The mass was mixed at 60° C. for 10 minutes; during this operation the atmosphere in the mill was purged with a stream of anhydrous nitrogen.

Also at about 60° C., the crosslinking agent B, catalyst E and bonding agent C were added to the contents of the mill. The mass was mixed for an additional 5 minutes at 60° C., then degassed at 3 kPa.

The autocurable composition thus obtained was then placed in airtight metallic containers.

(c) Measurement of mechanical properties:

To determine the ability of the composition to rapidly harden in ambient air into elastomeric state, it was spread with a doctor blade as a 2 mm thick layer on a sheet of polyethylene previously treated with a commercial anionic surface active agent. This surfactant was the sodium salt of an alkyl sulfate, the alkyl moiety of which was branched and had at least 12 carbon atoms.

The time required for the surface of the deposited layer to cease being sticky was noted. This measurement was made using a wooden stick, one of the two ends of which was placed into contact with the surface of the deposited layer. The existence of significant adhesion between the stick and the layer was examined. This measurement will be designated the non-stick time (t, in minutes) indicated in Table I below.

The following properties were measured on the film, after aging for 7 days:

SHORE A hardness (SAH), according to standard NF-T-51 109;

Tensile strength (T/S) in MPa, according to standard NF-T-46 002;

Elongation at break (E/B) in %, according to standard NF-T-46 002; and

Modulus (Y.M.) in MPa for an elongation of 100%.

Table II below reports two values for each mechanical property. The first value corresponded to the measurement made on the initial elastomer; the second value corresponded to the measurement made on the same elastomer heated to 100° C. for 48 hours.

$d_1$ Evaluation of adhesion: (dl) Qualitative evaluation of adhesion: the supports tested were anodized aluminum (AA), untreated aluminum (UA) and rigid PVC (PVC).

Two strands of composition were extruded onto a support plate (50×75 mm) 20 to 30 mm apart; each strand was 75 mm long and 8 to 10 mm in diameter.

Both strands were permitted to crosslink for 7 days at 20° C.

The ease of separation by hand was then tested.

The adhesion was then assigned a value from 0 (separation or break of the adhesive) to 100 (no separation or cohesive break).

The results are designated 1I in Table II below.

On another plate and after crosslinking for 7 days, the test piece was immersed in distilled water for 4 days at 20° C.

The test piece was then removed, dried and exposed to air for 24 hours.

The separation tests were then carried out, as indicated above. The results are designated 1E in Table II below.

The same operations and measurements noted under 1I and 1E above were carried out, with the difference that, after crosslinking for 7 days in ambient air, the test pieces were artificially aged at 100° C. for 48 hours in tubes.

The measurements made are designated 2I and 2E in Table II below.

(d2) Quantitative evaluation of adhesion:

This was carried out according to the AFNOR-P-85 standard for testing at 23° C. to rupture.

The tensile strength (T/S) was measured in MPa and the elongation at break (A/B) in %.

It was noted whether the break was cohesive (CB) or adhesive (AB). The percentage of adhesive and cohesive breaks was also noted.

The supports tested (see Table III below) were rigid PVC (PVC) and anodized aluminum (AA).

The results obtained are reported in Tables I to III below.

Table I sets forth the various components of the compositions in the examples.

Comparative Example 9 included τ-glycidoxypropyltrimethoxysilane as a bonding agent.

Comparative Example 10 included no bonding agent.

Table II sets forth the mechanical properties and the qualitative measurements of adhesion of the elastomers produced from the compositions of Examples 1 to 10.

Table III sets forth the quantitative measurements of adhesion of the elastomers produced from the compositions of Examples 2, 5, 6 and 8.

From Tables II and III, it will clearly be seen that the bonding agents according to the invention confer very good adhesion properties, both onto PVC and onto aluminum.

TABLE I

| | EXAMPLE | | | | | | | | | |
|---|---|---|---|---|---|---|---|---|---|---|
| | 1 | 2 | 3 | 4 | 5 | 6 | 7 | 8 | 9 | 10 |
| A1 | 100 | 100 | 0 | 0 | 100 | 100 | 100 | 100 | 100 | 0 |
| A2 | 0 | 0 | 100 | 100 | 0 | 0 | 0 | 0 | 0 | 100 |
| P1 | 43 | 43 | 0 | 0 | 43 | 0 | 43 | 43 | 0 | 0 |
| P2 | 0 | 0 | — | — | 0 | — | 0 | 0 | — | — |
| D1 | 15 | 0 | 0 | 0 | 0 | 0 | 0 | 0 | 0 | 15 |
| D2 | 0 | 15 | 15 | 16 | 12 | 12 | 12 | 12 | 16 | 0 |
| D3 | 0 | 0 | 0 | 0 | 40 | 50 | 50 | 0 | 0 | 0 |
| B1 | 0 | 6 | 6 | 6 | 7 | 0 | 7 | 6 | 6 | 0 |
| B2 | 0 | 0 | 0 | 0 | 0 | 7 | 0 | 0 | 0 | 6 |
| B3 | 6 | 0 | 0 | 0 | 0 | 0 | 0 | 0 | 0 | 0 |
| E1 | 0.1 | 0.1 | 0.1 | 0.1 | 0.1 | 0 | 0.1 | 0.1 | 0.1 | 0 |
| E2 | 0 | 0 | 0 | 0 | 0 | 0.3 | 0 | 0 | 0 | 0.3 |
| C1 | 2 | 0 | 0 | 0 | 2.5 | 2 | 0 | 2 | 0 | 0 |
| C2 | 0 | 2 | 4 | 4 | 0 | 0 | 3 | 0 | 0 | 0 |
| t (min) | 4 | 5 | 4 | 6 | 4 | 10 | 7 | 5 | 6 | 3 |

TABLE II

| | EXAMPLE | | | | | | | | | |
|---|---|---|---|---|---|---|---|---|---|---|
| | 1 | 2 | 3 | 4 | 5 | 6 | 7 | 8 | 9 | 10 |
| SAH | 15.7 | 15/10 | 15/7 | 15/8 | 17/13 | 17/4 | 17/— | 17/14 | 20/7 | 17/15 |
| YM | 0.3/0.2 | 0.3/0.2 | 0.2/0.2 | 0.3/0.2 | 0.3/0.2 | 0.3/— | 0.3/0.2 | 0.3/0.3 | 0.3/0.2 | 0.3/— |
| T/S | 2.0/0.8 | 2.0/1.0 | 1.6/1.0 | 1.6/1.4 | 1.0/1.0 | 1.0/— | 1.2/1.0 | 1.9/1.6 | 1.8/— | 1.8/— |
| E/B | 560/650 | 500/580 | 520/660 | 520/700 | 370/470 | 440/— | 420/580 | 470/630 | 430/530 | 500/— |
| A.B.1I | 100 | 100 | 100 | 100 | 100 | 100 | 100 | 100 | 100 | — |
| A.B.1E | 0 | 100 | 0 | 0 | 0 | 0 | 0 | 0 | 0 | — |
| A.B.2I | 100 | 100 | 100 | 100 | 100 | 100 | 100 | 100 | 100 | — |
| A.B.2E | 100 | 100 | 100 | 100 | — | — | — | 0 | 100 | — |
| A.A.1I | 100 | 100 | 100 | 100 | 100 | 100 | 100 | 100 | 100 | 100 |
| A.A.1E | 100 | 100 | 100 | 100 | 100 | 100 | 100 | 100 | 100 | 100 |
| A.A.2I | 100 | 100 | 100 | 100 | 100 | 100 | 100 | 100 | 100 | — |
| A.A.2E | 100 | 100 | 100 | 100 | 100 | 100 | 100 | 100 | 100 | 100 |
| PVC1I | 100 | 100 | 100 | 100 | 100 | 100 | 100 | 100 | 0 | — |
| PVC1E | 100 | 100 | 100 | 100 | 100 | 100 | 100 | 100 | 0 | — |
| PVC2I | 100 | 100 | 100 | 100 | 100 | 100 | 100 | 100 | 100 | — |
| PVC2E | 100 | 100 | 100 | 100 | — | 50 | 100 | 100 | 100 | — |

TABLE III

| | EXAMPLE | | | | | | | |
|---|---|---|---|---|---|---|---|---|
| | 8 | | 2 | | 6 | | 5 | |
| Support | A.A. | PVC | A.A. | PVC | A.A. | PVC | A.A. | PVC |
| YM | 0.25 | 0.26 | 0.40 | 0.40 | 0.45 | — | 0.28 | 0.27 |
| T/S | 0.3 | 0.3 | 0.45 | 0.40 | 0.45 | 0.37 | 0.31 | 0.29 |
| E/B | 150 | 160 | 120 | 120 | 100 | 100 | 180 | 180 |
| CB | 80 | 80 | 100 | 90 | 100 | 90 | 100 | 90 |
| AB | 20 | 20 | 0 | 10 | 0 | 10 | 0 | 10 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An organopolysiloxane composition of matter that is storage-stable under anhydrous conditions, but curable into elastomeric state in the presence of moisture, which comprises (A) at least one $\alpha,\omega$-dihydroxydiorganopolysiloxane polymer having a viscosity of 700 to 1,000,000 mPa at 25° C., comprising recurring diorganosiloxy structural units of the formula $T_2SiO$, in which the T radicals, which may be identical or different, are hydrocarbon radicals having from 1 to 10 carbon atoms, at least 50% of the number of such T radicals being methyl radicals; (B) at least one acyloxysilane crosslinking agent therefor; and (C) 0.1 to 10 parts by weight of a bonding agent comprising admixture, or interruption product of:

(i) an aminoorganosilicon compound $C_1$ bearing at least one amino functional group and comprising a primary amine substituent; and (ii) an organosilicon compound $C_2$ bearing at least one epoxy functional group and having from 4 to 20 carbon atoms in a ratio of 0.01 to 2 gram-equivalents of primary amine group in $C_1$ per one gram equivalent of epoxy functional group in $C_2$.

2. The organopolysiloxane composition as defined by claim 1, which comprises:

(A) 100 parts by weight of at least one $\alpha,\omega$-dihydroxydiorganopolysiloxane polymer having a viscosity of 700 to 1,000,000 mPa.s at 25° C., comprising recurring diorganosiloxy structural units of the formula $T_2SiO$, in which the T radicals, which may be identical or different, are hydrocarbon radicals having from 1 to 10 carbon atoms, at least 50% of the number of such T radicals being methyl radicals;
(B) 0.5 to 20 parts by weight of at least one crosslinking agent comprising at least one acyloxysilane;
(C) 0.1 to 10 parts by weight of a bonding agent comprising admixture, or interreaction product of:
  (i) an aminoorganosilicon compound $C_1$ bearing at least one amino functional group and comprising a primary amine substituent; and
  (ii) an organosilicon compound $C_2$ bearing at least one epoxy functional group and having from 4 to 20 carbon atoms;
(D) 5 to 250 parts by weight of inorganic filler material; and
(E) 0.0004 to 3 parts by weight of a metal curing catalyst.

3. The organopolysiloxane composition as defined by claim 2, wherein $C_1$ has one of the following formulae $C_1A$, $C_1B$ or $C_1C$:

$C_1A$: a silane of the formula:

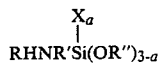

in which R is a hydrogen atom, an alkyl radical having from 1 to 6 carbon atoms, or an aliphatic hydrocarbon radical linked to the nitrogen atom by a carbon bond, and containing at least one primary amine group; R' is a divalent hydrocarbon radical having from 1 to 6 carbon atoms, optionally containing an ether bridge; R" is an alkyl or alkoxyalkyl radical having less than 8 carbon atoms; X is a vinyl radical, a phenyl radical, or an alkyl radical having from 1 to 6 carbon atoms; and a is 0 or 1;

$C_1B$: an aminoorganopolysiloxane comprising the reaction product of a silane $C_1A$ with a hydroxylated methylpolysiloxane (1) in a preparation of 0.4 to 1.2 gram-equivalents of $NH_2$ group per gram-equivalent of hydroxyl group; or $C_1C$: a diorganopolysiloxane comprising recurring $CH_3(RNHR')SiO$ units, wherein R' and R are as defined above.

4. The organopolysiloxane composition as defined by claim 3, wherein $C_2$ has one of the following formulae $C_2A$, $C_2B$ or $C_2C$:

$C_2A$: a silane of the formula:

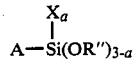

in which X, R" and a are as defined in $C_1A$; and A is a hydrocarbon radical bearing an epoxy group and having from 4 to 20 carbon atoms;

$C_2B$: aa diorganopolysiloxane endblocked with an epoxy functional group and comprising the reaction product of a silane $C_2A$ with the hydroxylated organopolysiloxane (1); or $C_2C$: a diorganopolysiloxane comprising recurring $ACH_3SiO$ units, wherein A is as defined above.

5. The organopolysiloxane composition as defined by claim 2, wherein $C_1$ and $C_2$ are present in a ratio, calculated in gram-equivalents of primary amine group of $C_1$ and in gram-equivalents of epoxy group of $C_2$, ranging from 0.01 to 1.

6. The organopolysiloxane composition as defined by claim 3, wherein $C_1$ has the formula $C_1A$, and said silane $C_1A$ comprises $(CH_3O)_3Si(CH_2)_3NH(CH_2)_2NH_2$;
$(CH_3OCH_2CH_2O)_3Si(CH_2)_2NH_2$; $(C_2H_5O)_3Si(CH_2)_3NH_2$;
$(CH_3OCH_2CH_2O)_3Si(CH_2)_3NH_2$; $(C_2H_5O)_3Si(CH_2)_3O(CH_2)_3NH_2$;
$(C_2H_5O)_2C_6H_5Si(CH_2)_3O(CH_2)_3NH_2$; $(C_2H_5O)_3SiCH_2O(CH_2)_2NH_2$;
$(CH_2H_5O)_3Si(CH_2)_3O(CH_2)_2NH_2$; or $(C_2H_5O)_2CH_3Si(CH_2)_3NH_2$.

7. The organopolysiloxane composition as defined by claim 4, wherein $C_2$ has the formula $C_2A$, and said silane $C_2A$ comprises:

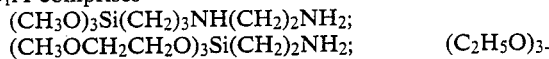

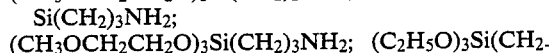

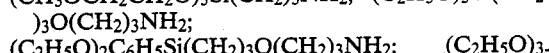

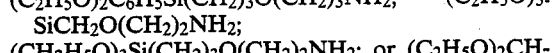

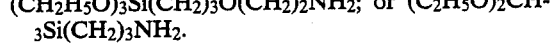

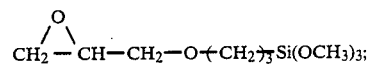

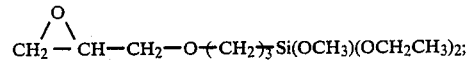

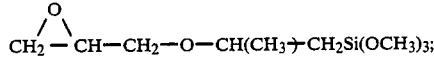

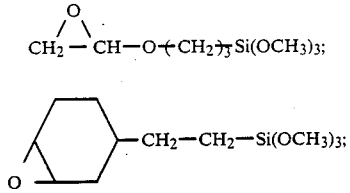

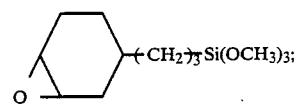

8. The organopolysiloxane composition as defined by claim 4, said bonding agent (C) comprising the reaction product of $C_1A$ with $C_2A$ and having one of the formulae:

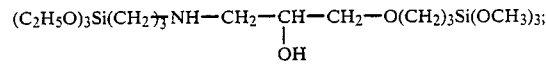

-continued

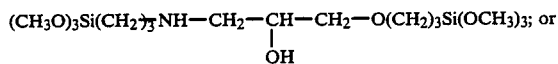

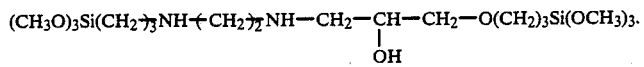

9. The organopolysiloxane composition as defined by claim 2 wherein said acyloxysilane cross-linking agent is di-t-butoxydiacetoxysilane, $B_1$, in a weight ratio $B_1/C$ ranging from 0.1 to 2.

10. The organopolysiloxane composition as defined by claim 2, in crosslinked elastomeric state.

11. A substrate having a deposit thereon of the organopolysiloxane elastomer as defined by claim 10.

12. A dispersion of the organopolysiloxane composition as defined by claim 2, in an inert organic diluent.

13. A sealant comprising the organopolysiloxane elastomer as defined by claim 10.

14. A sealed airtight container containing the organopolysiloxane composition as defined by claim 2.

* * * * *